United States Patent Office 3,846,145
Patented Nov. 5, 1974

3,846,145
REFRACTORY ARTICLES FOR METAL POURING TUBES AND THE LIKE
Ned Wright Roudabush, Cincinnati, Ohio, assignor to The Chas. Taylor's Sons Company, Cincinnati, Ohio
No Drawing. Filed Sept. 17, 1973, Ser. No. 398,141
Int. Cl. C04b 35/16
U.S. Cl. 106—57                    3 Claims

ABSTRACT OF THE DISCLOSURE

Improved refractory articles useful as metal pouring tubes and the like have been produced which possess increased corrosion resistance to molten metals and slags. The refractory article comprises from 45% to 72% of a fusion product, from 10% to 29% kyanite, from 3% to 14% zircon, from 3% to 11% calcined alumina, from 0.5% to 10% chromium oxide and from 1% to 7% silica. The composition for making the refractory article comprises a mixture of from 45% to 75% of a fusion product, from 10% to 30% of kyanite, from 3% to 15% zircon, from 3% to 12% calcined alumina and from 0.5% to 10% chromium oxide. The fusion product is a fused aggregate of substantially 1 part of zircon to 1 part of alumina.

BACKGROUND OF THE INVENTION

Ceramic compositions useful for forming metal pouring tubes have been made from refractory mixes of alumina and silica and other ingredients. Most of these compositions however form tubes which have a tendency to crack during the pressure pouring of the metal and they must be frequently replaced which is costly.

In U.S. Pat. No. 3,567,473, an improved ceramic composition is described which produces metal pouring tubes having improved resistant to thermal shock during metal pressure casting. This ceramic product is produced from a composition comprising a combination of alumina, zirconia and silica in various specific forms and various amounts of each ingredient employed. The method used for making the pouring tubes is described in detail in U.S. Pat. No. 3,476,847.

The instant invention employed compositions which are different in ingredients and amounts than those which are employed in U.S. Pat. No. 3,567,473. The pouring tubes however are made by a method similar to that disclosed in U.S. Pat. No. 3,476,847. The pouring tubes made by the instant invention have superior corrosion resistance to metals and slags and are superior in strength to those made by any of the prior art disclosures.

SUMMARY OF THE INVENTION

The refractory articles, such as metal pouring tubes and the like, made by the instant invention possess increased resistance to metal and slag corrosion.

The composition for making the refractory articles comprises from 45% to 75% of a fusion product, from 10% to 30% of kyanite, from 3% to 15% zircon, from 3% to 13% calcined alumina and from 0.5% to 10% chromium oxide. The fusion product is a fused aggregate of substantially 1 part of zircon to 1 part of alumina.

These refractory articles are prepared by admixing the fusion product with the other dry ingredients disclosed above and adding an aqueous solution of colloidal silica to the mixture to form a slurry of mud-like consistency, pumping the slurry into a mold, heating the slurry to gel the silica solution thereby to set the article, removing the article from the mold and drying and firing said green article to form said refractory article.

This process is similar to that described in U.S. Pat. No. 3,467,847 and U.S. Pat. No. 3,567,473 except that different ingredients in different amounts are employed.

The refractory product obtained comprises the following: from 45% to 72% of a fusion product, from 10% to 29% kyanite, from 3% to 14% zircon, from 3% to 11% calcined alumina, from 0.5% to 10% chromium oxide and from 1% to 7% silica, the fusion product containing substantially one part of zircon for each part of alumina.

DESCRIPTION OF THE PREFERRED EMBODIMENTS

The fusion product used in the composition for making the refractory articles is first prepared by admixing 0.5 to 1.5 parts of alumina with each part of zircon, melting the mixture in an electric arc furnace, solidifying the fused product and grinding the fused product until most of it is −8+40 mesh.

The other dry ingredients preferably should be ground or sized as follows:

|  | Mesh |
|---|---|
| Kyanite | −35 |
| Zircon | −40 |
| Calcined alumina | −325 |
| Chromium oxide | −325 |

The ingredients recited above are mixed in the following proportions:

|  | Percent |
|---|---|
| Fusion product | 45–75 |
| Kyanite | 10–30 |
| Zircon | 3–15 |
| Calcined alumina | 3–12 |
| Chromium oxide | 0.5–10 |

Using the various ingredients in the amounts specified above and in the size ranges indicated produced compositions having optimum density and forming characteristics.

The entire mixture is suspended in a colloidal silica solution, thus forming a slurry having a mud-like consistency. The colloidal silica solution should be added in amount from 5% to 15% by weight of the total ingredients employed and the solution should contain from 20% to 40% silica. It is desirable to have present in the mixture from 1% to 7% silica as the binder for the mixture. The slurry is then trickled into a vacuum chamber to remove the air bubbles. The slurry is then pumped into a mold having the configuration of the pouring tube for example, and is heated to cause the colloidal silica solution to gel and thereby set the slurry into the configuration of the mold.

After setting, the molded article is dried at a low temperature and then fired to form the refractory article. The refractory article is resistant to thermal shock and is more resistant to conversion by metals of slags than the articles produced by the prior art including Pat. No. 3,567,473.

In order to describe the instant invention in more detail, the following example is presented:

In this example a fusion product containing 1 part of alumina for each part of zircon was used.

The ingredients were mixed in the following amounts in the size ranges indicated:

|  | Mesh | Percent |
|---|---|---|
| Fusion product | −8+10 | 26.6 |
|  | −10+38 | 22.0 |
|  | −40 | 10.4 |
| Kyanite | −35+325 | 10.2 |
|  | −325 | 10.2 |
| Zircon | −40 | 10.6 |
| Calcined alumina | −325 | 8.0 |
| Chromium oxide | −325 | 2.0 |

This mixture was then added to 10% of a colloidal silica solution containing 30% of silica. The slurry formed a mud-like consistency. This thick slurry was then placed into a vacuum tank at a vacuum of 28 inches of mercury to remove the air bubbles. The slurry was then added to a pouring tube mold, heated to 150° F. to gel the colloidal silica into the configuration of the pouring tube. The green pouring tube was then dried at about 150° F. for 12 hours and then fired at 2650° F. for 36 hours.

For comparison purposes a pouring tube was prepared as a control having the same composition as the tube prepared above except that the control tube contained no chromic oxide.

These pouring tubes were then tested for corrosion resistance to both metals and slags and it was found that the pouring tube containing the chromic oxide was superior to the pouring tube containing no chromic oxide. In addition the pouring tube containing the chromic oxide was used for more than twice as many heats as the tube which did not contain the chromic oxide.

Pouring tubes having other quantities of the various ingredients may also be used provided the amounts employed fall within the range specified above.

Typical compositions which contain chromic oxide and which form superior tubes are presented in the following table along with those of the previously described example and the corresponding control run.

From the above description and by the examples presented, pouring tubes and the like are made from the following composition which contains chromium oxide:

| | Percent |
|---|---|
| Fused alumina and zirconia | 45–75 |
| Kyanite | 10–30 |
| Zircon | 3–15 |
| Calcined aluminum | 3–12 |
| Chromium oxide | 0.5–10 |

Similar compositions containing no chromium oxide possess inferior resistance to corrosion of metals and slags.

While this invention has been described and illustrated by the examples shown, it is not intended to be strictly limited thereto, and other variations and modifications may be employed within the scope of the following claims.

| Ingredients | Mesh size | Example (percent) | | | | |
|---|---|---|---|---|---|---|
| | | 1 | Control | 2 | 3 | 4 |
| Fused alumina and zirconia | −8+10 | 26.6 | 26.6 | 10 | 30 | 20 |
| | −10+38 | 22.0 | 22.0 | 30 | 10 | 25 |
| | −40 | 10.4 | 10.4 | 30 | 13 | 5 |
| Kyanite | −35 | 10.2 | 10.2 | 5 | 20 | 5 |
| | −325 | 10.2 | 10.2 | 5 | 5 | 18 |
| Zircon | −40 | 10.6 | 10.6 | 5 | 10 | 16 |
| Calcined alumina | −325 | 8.0 | 10.0 | 10 | 5 | 3 |
| Chromium oxide | −325 | 2.0 | 0 | 5 | 7 | 9 |

What is claimed is:

1. Refractory composition useful for making metal pouring tubes and the like consisting essentially of from 45% to 75% of a fusion product, from 10% to 30% kyanite, from 3% to 15% zircon, from 3% to 12% calcined alumina and from 0.5% to 10% chromic oxide, said fusion product being a fused aggregate of substantially 0.5 to 1.5 parts of zircon for each part of alumina, said composition also containing in addition from 1% to 7% silica.

2. A method for preparation of a refractory article useful for making metal pouring tubes and the like which comprises admixing the following ingredients:

45–75% fusion product
10–30% kyanite
3–15% zircon
3–12% calcined alumina
0.5–10% chromic oxide said fusion product being a fused mixture of .5 to 1.5 parts of alumina for each part of zircon, adding to said mixture colloidal silica to form a slurry, the amount of silica added being from 1% to 7% of the weight of the mixture, adding said slurry to a mold, heating said slurry in said mold to gel the colloidal silica and to form said atricle into the configuration of said mold, removing said molded article from said mold and drying and firing said article to produce said refractory article, said fusion product prepared by admixing 0.5 to 1.5 parts of zircon for each part of alumina, melting the mixture, solidifying the fused product and grinding the fused product to substantially −8+40 mesh.

3. A refractory composition useful as a metal pouring tube and the like consisting essentially of from 45% to 72% of a fusion product, from 10% to 29% kyanite, from 3% to 14% zircon, from 3% to 11% calcined alumina, from 0.5% to 9% chromic oxide and from 1% to 7% silica, said fusion product being a fused aggregate of substantially 0.5 to 1.5 parts of zircon for each part of alumina.

References Cited
UNITED STATES PATENTS

| | | | |
|---|---|---|---|
| 3,437,499 | 4/1969 | Horak et al. | 106—65 |
| 3,567,473 | 3/1971 | Drever et al. | 106—65 |
| 3,782,980 | 1/1974 | Smith | 106—57 |

JAMES E. POER, Primary Examiner

U.S. Cl. X.R.

106—65